(12) United States Patent
Blackmore, Jr.

(10) Patent No.: US 10,231,387 B2
(45) Date of Patent: Mar. 19, 2019

(54) PLANT TRAY

(71) Applicant: Blackmore Company, Inc., Belleville, MI (US)

(72) Inventor: Fred N. Blackmore, Jr., Belleville, MI (US)

(73) Assignee: Blackmore Company, Inc., Belleville, MI (US)

( * ) Notice: Subject to any disclaimer, the term of this patent is extended or adjusted under 35 U.S.C. 154(b) by 431 days.

(21) Appl. No.: 14/920,339

(22) Filed: Oct. 22, 2015

(65) Prior Publication Data

US 2016/0037735 A1    Feb. 11, 2016

Related U.S. Application Data

(63) Continuation-in-part of application No. 13/888,934, filed on May 7, 2013, now Pat. No. 9,265,201.

(51) Int. Cl.
*A01G 9/02* (2018.01)
*A01G 9/029* (2018.01)
*A01G 9/10* (2006.01)

(52) U.S. Cl.
CPC .......... *A01G 9/028* (2013.01); *A01G 9/0295* (2018.02); *A01G 9/104* (2013.01)

(58) Field of Classification Search
CPC ....... A01G 9/028; A01G 9/0295; A01G 9/104
USPC ................... 48/65.5, 73, 79; 47/65.5, 73, 79
See application file for complete search history.

(56) References Cited

U.S. PATENT DOCUMENTS

| | | | |
|---|---|---|---|
| 1,775,831 A * | 9/1930 | Salisbury | A01G 9/021 47/65.5 |
| 1,778,150 A | 10/1930 | Freeburg | |
| 3,386,608 A | 6/1968 | Krikorian | |
| 3,556,387 A * | 1/1971 | Trimble | B65D 85/324 206/521.8 |
| 3,627,128 A | 12/1971 | Ostrowsky | |
| 3,810,329 A | 5/1974 | Lecuru et al. | |
| D235,031 S * | 4/1975 | Jansen | D11/147 |

(Continued)

FOREIGN PATENT DOCUMENTS

| | | | |
|---|---|---|---|
| EP | 0240365 A1 | 10/1987 | |
| EP | 0704151 A1 | 4/1996 | |
| GB | 2433015 A * | 6/2007 | ............. A01G 9/028 |

OTHER PUBLICATIONS

European Search Report dated Mar. 14, 2017 issued in corresponding European Patent Application 15192796.9 (7 pages).

*Primary Examiner* — Tien Q Dinh
*Assistant Examiner* — Ebony E Evans
(74) *Attorney, Agent, or Firm* — Harness, Dickey & Pierce, P.L.C.

(57) ABSTRACT

The present teachings provide for a horticulture tray including a growing cell. The growing cell can include a first end, a second end, and a sidewall. The first end can define a first aperture. The second end can be opposite to the first end. The sidewall can define a plurality of arcuate shaped chambers that can extend longitudinally between the first and second ends. Each arcuate shaped chamber can define a plant supporting portion proximate to and spaced apart from the second end. Each arcuate shaped chamber can continuously taper from the first end to the plant supporting portion at a first rate and can continuously taper from the plant supporting portion to the second end at a second rate. The second rate can be greater than the first rate.

13 Claims, 10 Drawing Sheets

(56) References Cited

U.S. PATENT DOCUMENTS

| | | | |
|---|---|---|---|
| 3,931,694 A | 1/1976 | Krikorian | |
| 4,118,892 A | 10/1978 | Nakamura et al. | |
| 4,144,672 A | 3/1979 | Gradwell et al. | |
| 4,242,834 A * | 1/1981 | Olsen | A01G 9/0295 47/73 |
| 4,296,569 A * | 10/1981 | Edwards | A01G 9/0297 47/73 |
| 4,394,214 A * | 7/1983 | Bixler | B65D 85/32 162/228 |
| 4,597,222 A | 7/1986 | Roode | |
| 4,658,542 A * | 4/1987 | Holmberg | A01G 9/0295 47/86 |
| 4,753,037 A | 6/1988 | Whitcomb | |
| 4,795,080 A * | 1/1989 | McIntyre | B65D 85/324 206/521.1 |
| 4,931,301 A * | 6/1990 | Giuseppe | A21B 5/026 249/122 |
| 5,102,034 A * | 4/1992 | Amabili | B65D 85/324 206/521.1 |
| 5,127,189 A * | 7/1992 | Holmberg | A01G 9/0295 47/87 |
| 5,327,679 A * | 7/1994 | Hawthorne | A01G 9/029 47/73 |
| 5,339,566 A | 8/1994 | Cormier | |
| 5,459,960 A * | 10/1995 | Manlove | B29C 47/0023 47/65.5 |
| D366,227 S * | 1/1996 | Weder | D11/143 |
| D384,000 S * | 9/1997 | Panth | D11/143 |
| 5,761,848 A * | 6/1998 | Manlove | A01G 9/10 47/65.5 |
| D461,677 S * | 8/2002 | Bradley | D7/357 |
| 6,901,699 B2 | 6/2005 | Hartman | |
| 7,082,718 B2 | 8/2006 | Dummen | |
| 7,210,266 B2 * | 5/2007 | Henry | A01G 9/021 47/32.7 |
| 7,353,951 B2 * | 4/2008 | Vovan | B65D 71/70 206/521.1 |
| 7,681,357 B2 | 3/2010 | Dyas | |
| 7,774,981 B2 | 8/2010 | Whitcomb | |
| D643,266 S * | 8/2011 | Kulzer | D7/553.2 |
| 8,136,294 B2 | 3/2012 | Wismans | |
| 2004/0118730 A1 | 6/2004 | Kennedy | |
| 2008/0115413 A1 | 5/2008 | Blackmore | |
| 2010/0162624 A1 | 7/2010 | Bradley | |
| 2011/0258928 A1 | 10/2011 | Adams | |
| 2012/0036773 A1 | 2/2012 | Khoo | |
| 2013/0160361 A1 | 6/2013 | Keithly | |
| 2014/0331554 A1 | 11/2014 | Blackmore, Jr. | |
| 2014/0366444 A1 * | 12/2014 | Kubern | A01G 9/0295 47/73 |

* cited by examiner

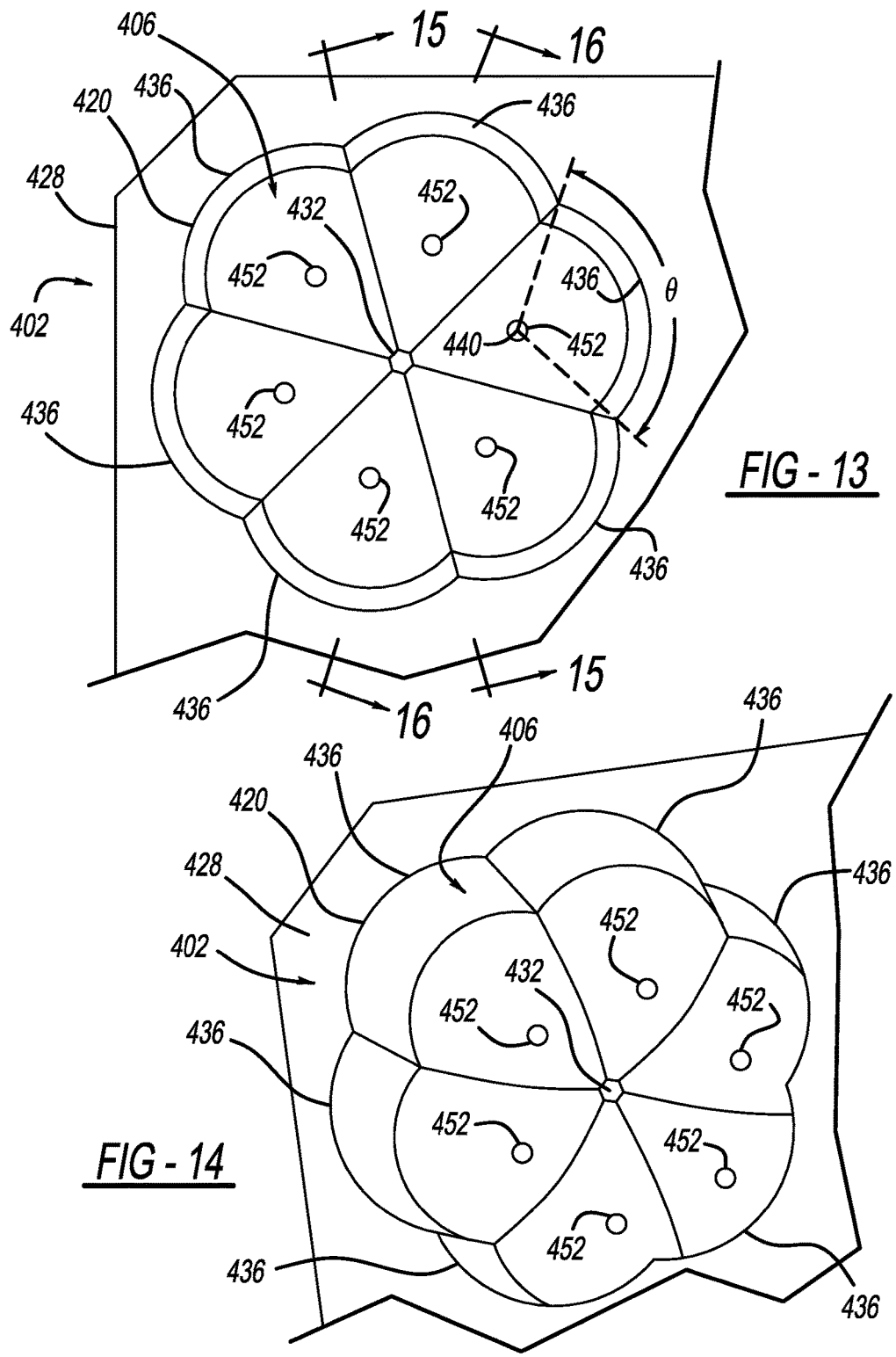

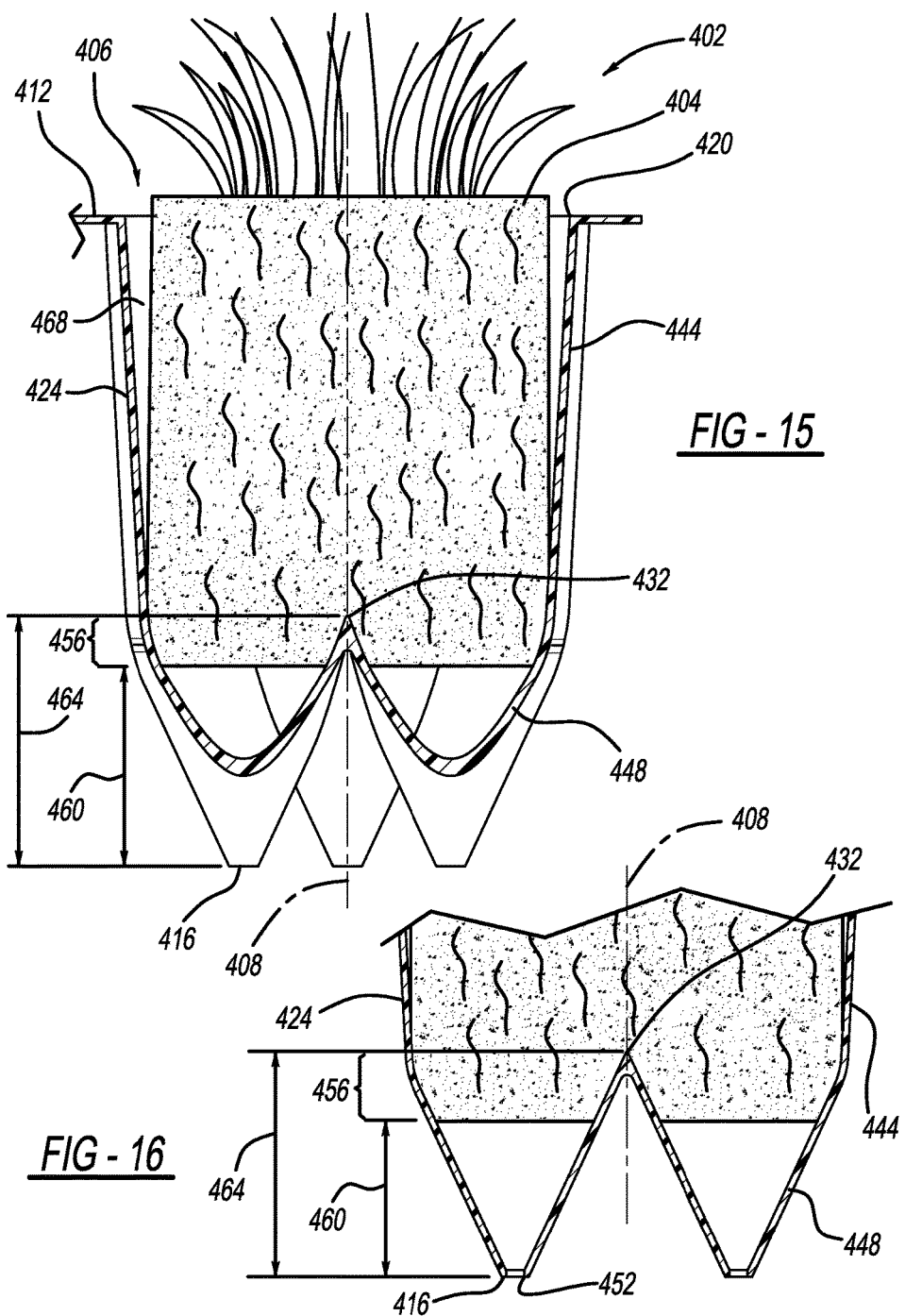

PLANT TRAY

CROSS-REFERENCE TO RELATED APPLICATION

This application is a continuation-in-part of U.S. patent application Ser. No. 13/888,934 filed on May 7, 2013, the entire disclosure of which is incorporated herein by reference.

FIELD

The present disclosure relates to horticulture plant trays, for use with stabilized growing media.

BACKGROUND

This section provides background information related to the present disclosure which is not necessarily prior art.

Plants and trees require a branching and robust root structure to properly anchor them in the ground. Plants that do not have good root architecture, but rather have developed circular or spiral root structure, often referred to as girdling, may live for many years in the landscape before succumbing to the inherent problems caused by girdling. The economic damage caused by root system failure can be considerable.

Lack of proper root architecture or structure may lead to uprooting due to storms, wind, or even field saturation of the soil. Girdling can also lead to issues with mechanical harvesting (shaking) of nuts and fruits in commercial horticulture. Trees that fall over degrade the landscape, diminish the aesthetics of otherwise pleasant environments, cause property damage and utility outages. In commercial harvesting, where trees are often shaken to make ripened fruit or nuts drop, trees without proper root architecture may be damaged or even be pulled from the ground due to the shaking, resulting in crop and financial loss. Large trees are not easily replaced in the landscape and commercial fruit or nut bearing trees normally require many years to mature before harvesting is again possible.

The botanical term adventitious roots, is used to describe where mechanical pruning of a tap root forces lateral rooting. Field research has shown that air pruning promotes root architecture that is superior to mechanical pruning, particularly for species with a tap root.

Furthermore, many areas of the world where the need of reforestation is greatest also have limited water resources. Thus, water retention is an important design component of any production system that is to be viable in these regions. When watering plants in some horticulture trays, water can splash off the canopy of the plants and into unintended portions of the tray, which can lead to over, under, or uneven watering of plants in the tray. Additionally, horticulture trays are often placed outdoors on ground that is not level, which can cause too much water to flow from one tray to another in some trays.

Horticulture trays are often used to transport, store, and grow seeds and plants. Horticulture trays allow plants to be grown in ideal and protected conditions before being transported to their permanent locations. However, the confines of horticulture trays can often cause root girdling that affect the plants long after transplanting into the landscape. Thus there exists a need for horticulture trays that eliminate root girdling and promote proper root architecture.

Although there have been efforts to address the problems mentioned above, adequate solutions for providing the robust, lateral root architecture sought are not available. Existing production methods and containers fail to promote a generally linear root structure. A horticulture tray that can provide proper water management, active or passive, would also be desirable.

Prior horticulture trays are designed for use with loose fill growing media, such as loose soil, or soil-less mixes. These trays often attempt to mitigate girdling by including small holes in the sides or walls of the trays that allow roots that reach the holes to be air pruned. However, these holes can air prune only the roots that come in contact with them. Prior trays have also attempted to mitigate girdling by including vertical protrusions perpendicular to the sidewalls to prevent roots from following the sidewalls in a horizontal or circular direction. These vertical protrusions still fail to adequately prevent root girdling and promote proper root architecture by directing roots back toward the center of the tray causing a spiraling root structure.

Furthermore, stabilized growing media, sometimes referred to as stabilized growth plugs, or by trade name (such as Ellepots™ by The Blackmore Company), exist as a convenient, economical alternative to loose fill. Stabilized growth plugs can include soil, mulch, or peat moss wrapped in biodegradable paper, or can include other organic or synthetic substrate which retains its shape without a separate, supporting pot structure. These stabilized growth plugs can be planted directly into the ground making transplanting easier and more economical. As such, there exists a need for trays designed for growing and transporting plants in stabilized growth plugs which overcome the limitations of conventional loose fill trays while promoting proper root architecture and water retention.

SUMMARY

This section provides a general summary of the disclosure, and is not a comprehensive disclosure of its full scope or all of its features.

The present teachings provide for a horticulture tray including a growing cell. The growing cell can include a first end, a second end, and a sidewall. The first end can define a first aperture. The second end can be opposite to the first end. The sidewall can define a plurality of arcuate shaped chambers that can extend longitudinally between the first and second ends. Each arcuate shaped chamber can define a plant supporting portion proximate to and spaced apart from the second end. Each arcuate shaped chamber can continuously taper from the first end to the plant supporting portion at a first rate and can continuously taper from the plant supporting portion to the second end at a second rate. The second rate can be greater than the first rate.

The present teachings provide for a horticulture tray including a growing cell. The growing cell can include a first end, a second end, a sidewall, and at least one drain hole. The first end can define a first aperture. The second end can be opposite to the first end. The sidewall can define a plurality of arcuate shaped chambers disposed about a central axis of the growing cell. The arcuate shaped chambers can extend longitudinally between the first and second ends and can have a curve angle of 110°-130°. Each arcuate shaped chamber can define a plant supporting portion axially between first and second ends. Each arcuate shaped chamber can have a first length that tapers between the first end and the plant supporting portion at a first rate and a second length that tapers from the plant supporting portion to the second end at a second rate. The second rate can be greater than the first rate. The drain hole can be configured to allow excess liquid to drain from the second end.

The present teachings provide for a horticulture tray including a plurality of growing cells. Each growing cell can include an outer lip, a first end, a second end, a ridge, a sidewall, and at least one drain hole. The first end can define a first aperture. The second end can be opposite to the first end. The ridge can be disposed between the outer lip and the first end. The ridge can prevent fluid communication between adjacent ones of the growing cells when a fluid level is above the first end and below the ridge. The sidewall can define a plurality of arcuate shaped chambers disposed about a central axis of the growing cell. The arcuate shaped chambers can extend longitudinally between the first and second ends. Each arcuate shaped chamber can have a curve angle of 110°-130° and can define a plant supporting portion axially between first and second ends. Each arcuate shaped chamber can continuously taper from the first end to the plant supporting portion at a first rate and can continuously taper from the plant supporting portion to the second end at a second rate. The second rate can be greater than the first rate. The drain hole can be configured to allow excess liquid to drain from the second end.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 13 is a top view of a single growing cell of the horticulture tray of FIG. 11;

FIG. 14 is a perspective view of a portion of the growing cell of FIG. 13;

FIG. 15 is a sectional view of the growing cell of FIG. 13, taken along line 15-15 shown on FIG. 13;

FIG. 16 is a sectional view of the growing cell of FIG. 13, taken along line 16-16 shown on FIG. 13;

Corresponding reference numerals indicate corresponding parts throughout the several views of the drawings.

DETAILED DESCRIPTION

Example embodiments will now be described more fully with reference to the accompanying drawings.

Figure 1:
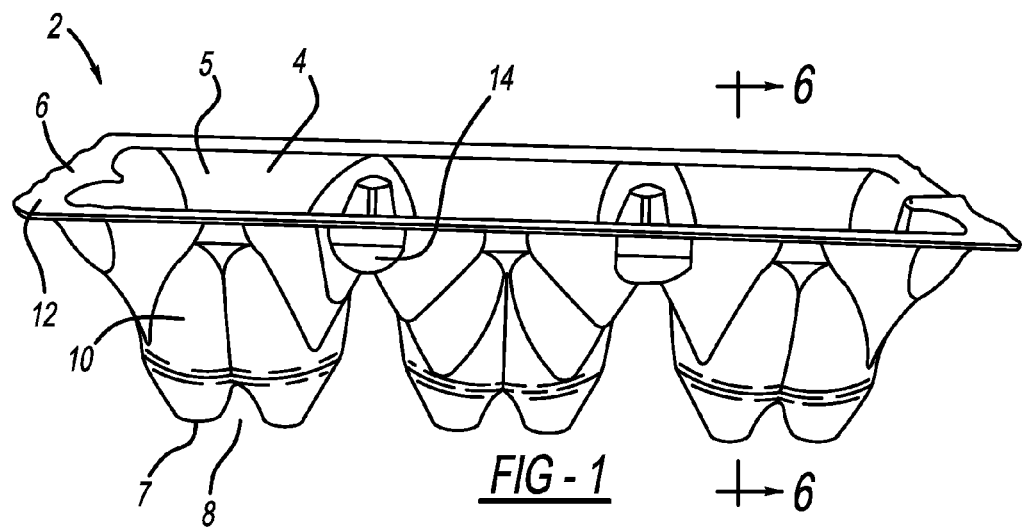
FIG. 1 is a perspective view of the front of a horticulture tray.

With initial reference to FIG. 1, a horticulture tray according to the present teachings is illustrated at reference numeral 2. The horticulture tray 2 is configured for growing and transporting plants grown in stabilized growth plugs, such as the growth plug 16 illustrated in FIG. 5, while preventing root spiraling or girdling, and promoting proper root architecture through air pruning, while also efficiently retaining water. These trays are generally made of a substantially rigid material such as plastic or other polymer and can be formed using methods known in the art such as vacuum thermoforming or injection molding.

The horticulture tray 2 may include one or more growing cells 4. FIG. 1 shows an array with a single row of growing cells 4, though a matrix with a plurality of rows and columns can be provided. When an array or matrix of growing cells 4 are included, the distances between the centers of each growing cell 4 are equal to allow uniform plant growth such that each plant has equal space to develop foliage. The growing cell 4 includes a first aperture 5 defined at a first end 6, a second aperture 7 defined at a second end 8 opposite the first end 6, a sidewall 10, and a top lip 12. When an array or matrix of growing cells 4 are included, an optional configuration allows the sidewalls 10 of adjacent cells to merge below the top lip 12, to form a dam 14. The optional dam 14 retains liquid in an individual growing cell 4, while allowing liquid to flow between cells when the liquid is filled above the dam 14, but below the top lip 12. The optional dam 14 allows for the separate watering of individual growing cells 4 when filled below the dam 14, while allowing for even distribution of water amongst a plurality of cells when filled above the dam. The top lip 12 can be flat with no over-turned edges such that when multiple horticulture trays 2 are arranged adjacent to each other, the top lips 12 may be overlapped. Overlapping of the top lips 12 can prevent water loss from run-off and spills that would otherwise fall between adjacent horticulture trays 2. The top lip 12 is further configured such that when the top lips 12 of adjacent horticulture trays 2 are overlapped, the distance between the centers of the growing cells 4 of the adjacent horticulture tray 2 is equal to the distance between the centers of the growing cells 4 within each individual horticulture tray 2. This configuration allows equal space to each plant for uniform plant growth when multiple horticulture trays 2 are such arranged adjacently.

The second end 8 is more narrow than the first end 6 and the sidewalls 10 of the horticulture tray 2 are continuously tapered from the first end 6 to the second end 8 such that no horizontal surfaces contact the roots of a stabilized growth plug 16 (shown in FIG. 5) when the stabilized growth plug 16 is seated in the growing cell 4. The horticulture tray 2 also includes no surfaces extending perpendicularly from the sidewalls 10 that contact the stabilized growth plug 16, which can advantageously promote proper root architecture which is uniform, structured vertically from the first end 6 to the second end 8 as illustrated at reference numerals 36 and 38 in FIG. 5. An improper root structure (not shown) would include spiraling or girdling roots.

Figure 2:
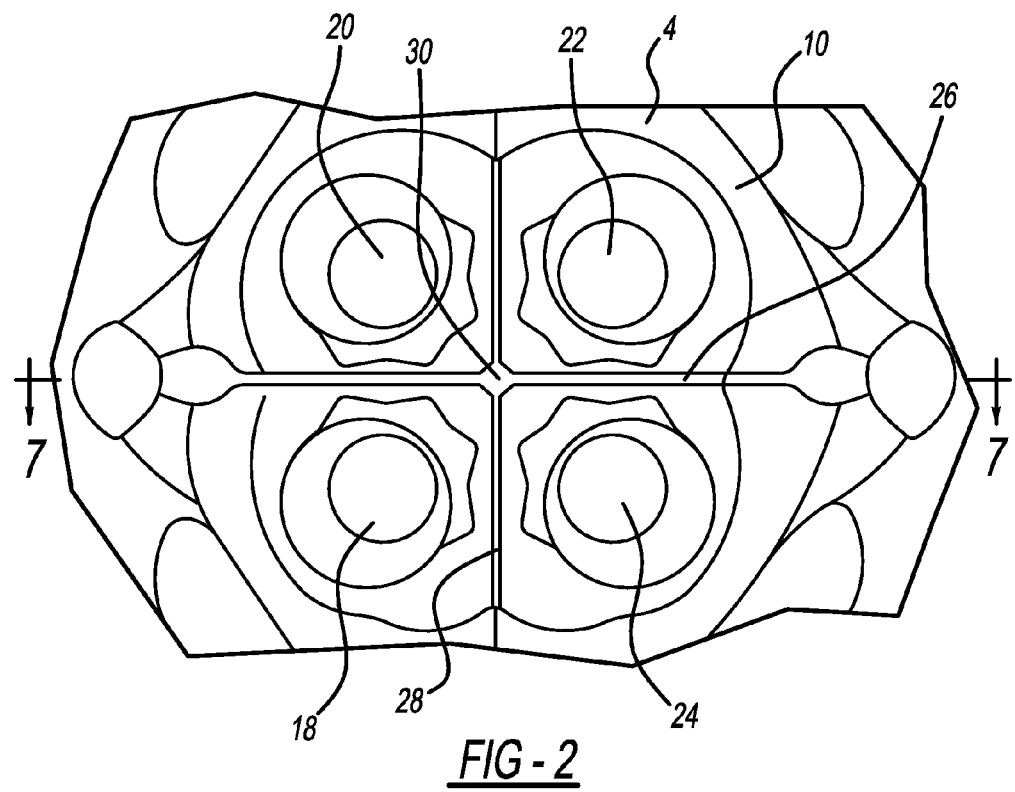
FIG. 2 is a top view of a single growing cell of the horticulture tray of FIG. 1.

FIG. 2 is a top view of a single growing cell 4, looking down from the first end 6 of the growing cell 4. A first drain hole 18 facilitates the draining of excess liquid from the second end 8, while allowing air flow to a bottom end of the stabilized growth plug 16. A second, third and fourth drain hole 20, 22, 24, are also included, but any number of drain holes could be included for the same purpose. A lateral support ridge 26 extends along the second end 8, between the first and second drain holes 18, 20 and between the third and fourth drain holes 22, 24. A longitudinal support ridge 28 extends along the second end 8, between the first and fourth drain holes 18, 24 and between the second and third drain holes 20, 22. The intersection of the lateral support ridge 26 and the longitudinal support ridge 28 forms a support peak 30, which can provide additional support to the stabilized growth plug 16 to support the stabilized growth plug 16 spaced apart from the second end 8. The lateral support ridge 26 and longitudinal support ridge 28 extend from the sidewall 10 at an angle such that neither support ridge is horizontal (see FIG. 7).

Figure 3:
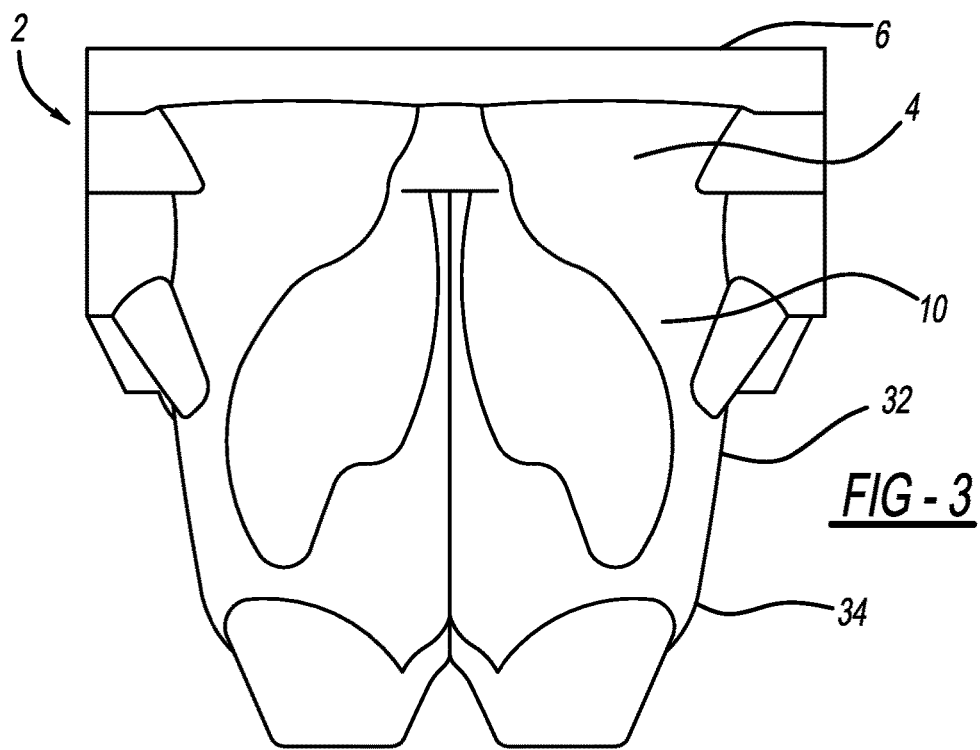
FIG. 3 is a front view of a single growing cell of the horticulture tray of FIG. 1.

FIG. 3 is a front view of a single growing cell 4. The sidewall 10 of the growing cell 4 is continuously tapered from a first diameter at the first end 6 to a second, smaller diameter at the second end 8. The sidewall 10 can comprise a first length 32 and a second length 34. The second length 34 being more tapered than the first length 32.

Figure 4:
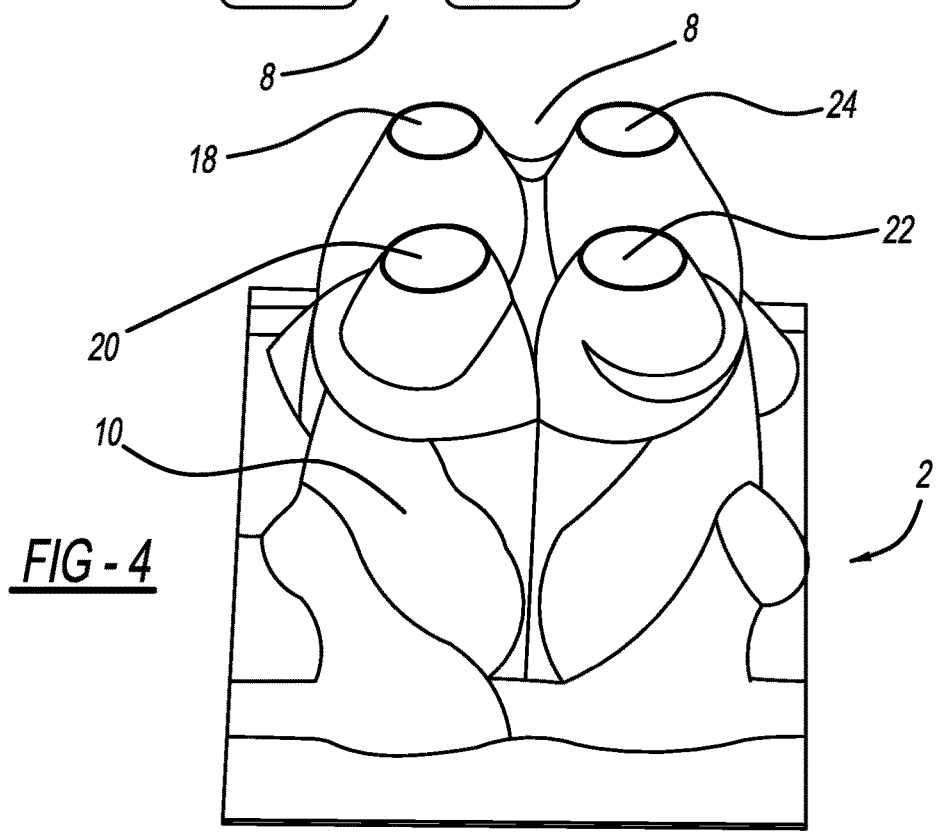
FIG. 4 is a perspective view of the second end of the horticulture tray of FIG. 1.

FIG. 4 is a perspective view of a single growing cell 4 as seen from the second end 8. The first, second, third, and fourth drain holes 18, 20, 22, and 24 are shown.

Figure 5:
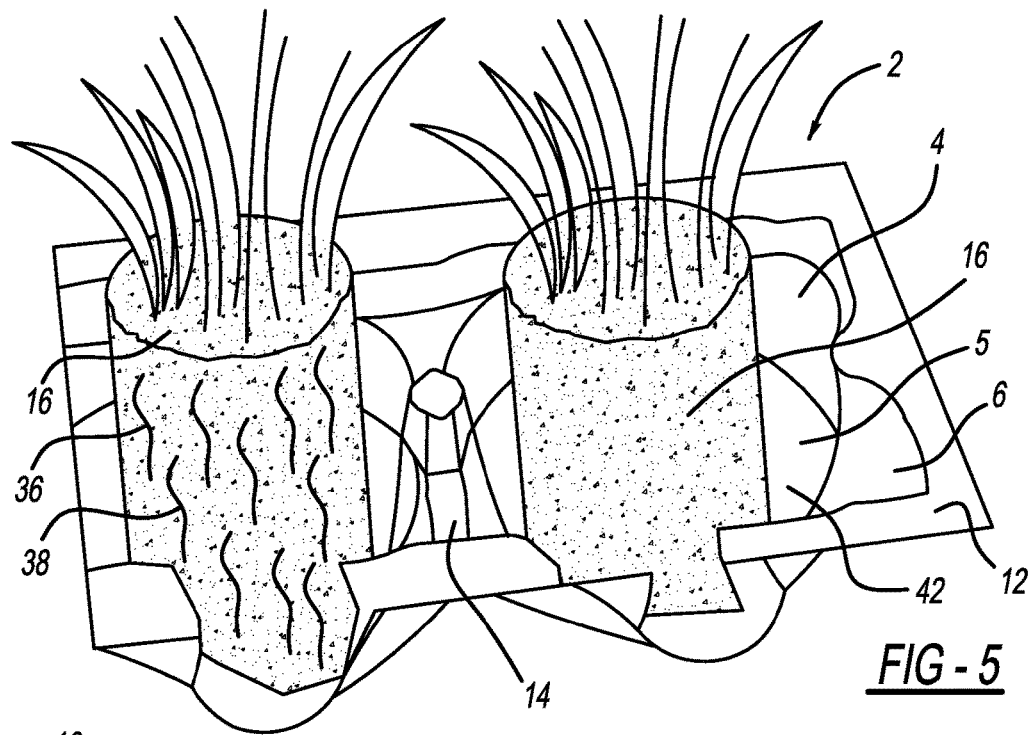
FIG. 5 is a cut-away perspective view of a horticulture tray with stabilized growth plugs.

FIG. 5 is a cut-away perspective view of the horticulture tray 2 showing two growing cells 4 with stabilized growth plugs 16. The stabilized growth plugs 16 are not in contact with the sidewalls 10 of the growing cell 4 along the majority of the stabilized growth plug 16. The lack of contact between the stabilized growth plug 16 and the sidewalls 10 allows air to flow around the stabilized growth plug 16 and promote a proper root system 36 by air pruning. An example of the proper root system 36 is shown with a plurality of uniformly growing roots 38 growing vertically from the first end 6 to the second end 8. An improper root structure (not shown) would include spiraling or girdling roots.

Figure 6:
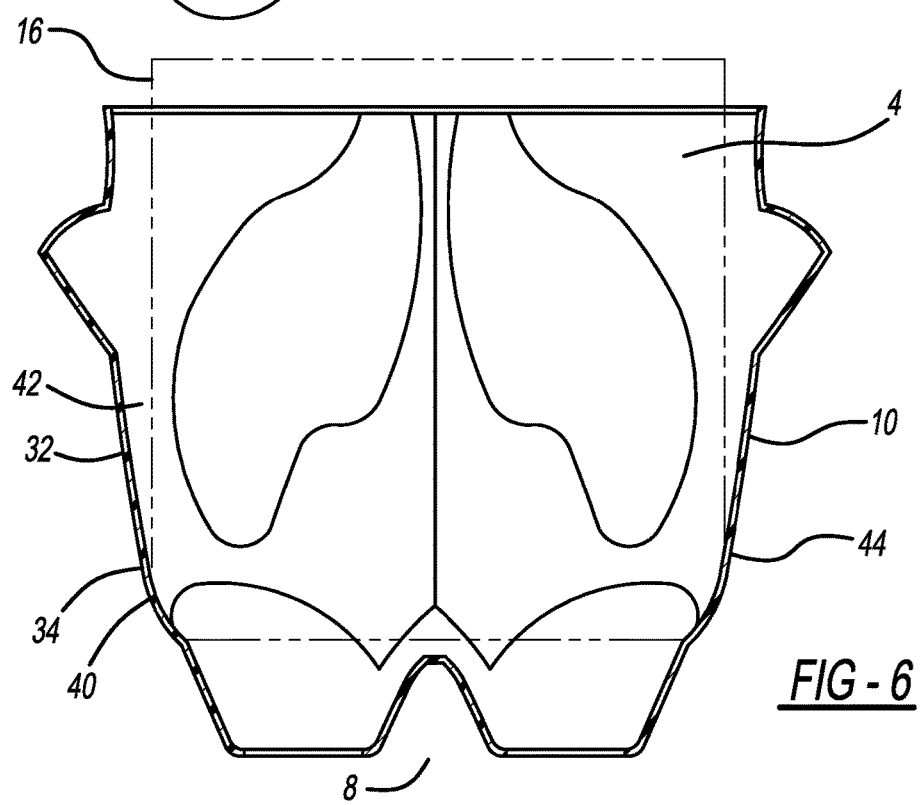
FIG. 6 is a section view of a single growth cell.

FIG. 6 shows a section view of a single growing cell 4 with an outline of the stabilized growth plug 16. The second length 34 forms a plant supporting portion 40, proximate to the second end 8, which supports the stabilized growth plug 16. The stabilized growth plug 16 is supported above and spaced apart from the second end 8, preventing the stabilized growth plug 16 from contacting the bottom of the growing cell 4. The plant supporting portion 40 supports the stabilized growth plug 16 by tapering to a diameter narrower than the diameter of the stabilized growth plug 16, such that the stabilized growth plug 16 rests on, or can be pressed into the diameter of the plant supporting portion 40.

The plant supporting portion 40 further supports the stabilized growth plug 16 such that a perimeter gap 42 is formed between the first length 32 of the sidewall 10 and the stabilized growth plug 16, allowing air to flow around the perimeter of the stabilized growth plug 16. The perimeter gap 42 allows the roots 38 to be air pruned along substantially the entire length of the stabilized growth plug 16, thus promoting proper root architecture. The stabilized growth plug 16 contacts the sidewall 10 where the sidewall 10 becomes more narrow than the stabilized growth plug 16 to form a sealing point 44. The sealing point 44 creates a seal between the stabilized growth plug 16 and the sidewall 10 which allows liquid to collect in the perimeter gap 42.

Figure 7:
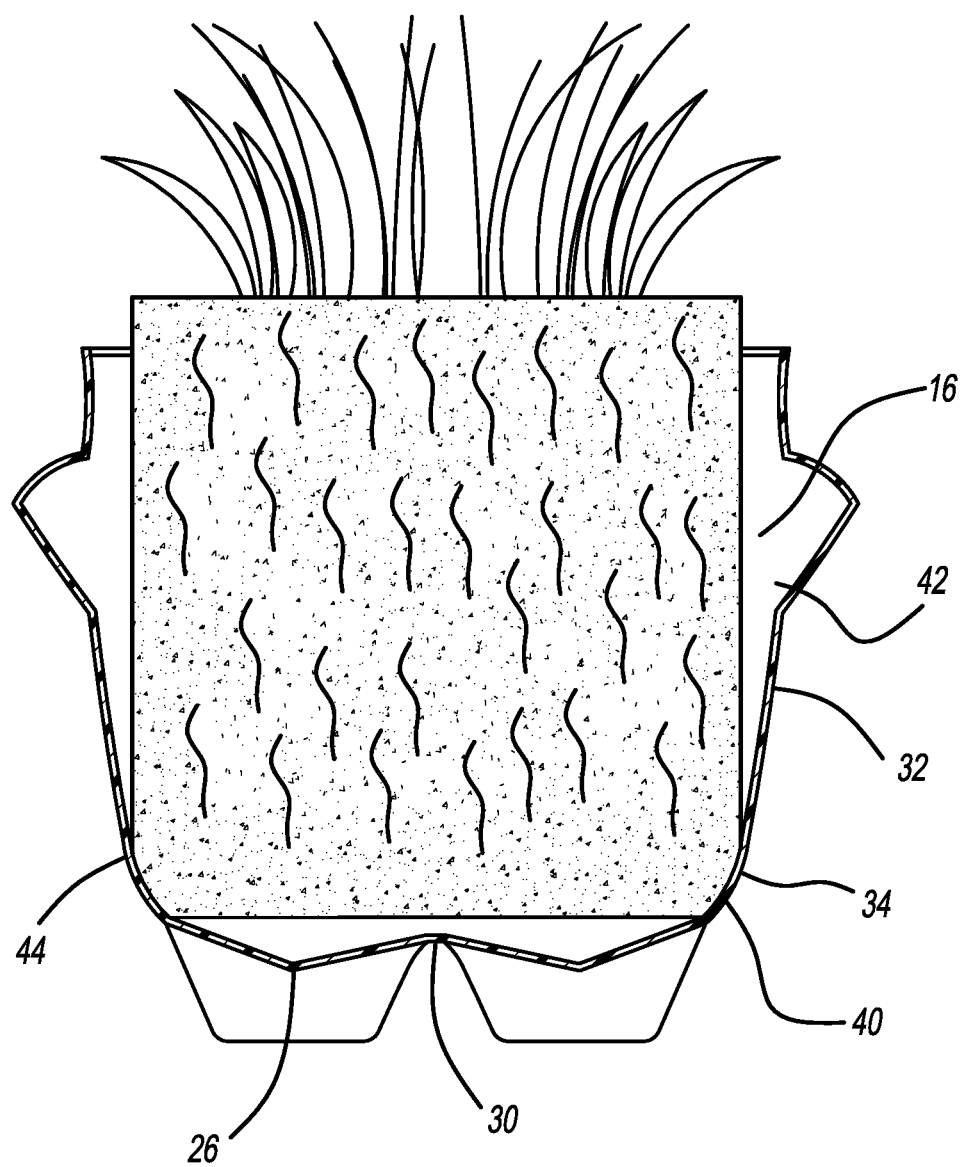
FIG. 7 is another section view of a single growth cell.

FIG. 7 is another section view of a single growth cell. The stabilized growth plug 16 is shown. The lateral support ridge 26 can be seen to not include horizon surfaces and to form the support peak 30 near the center of the growing cell 4.

Figure 8:
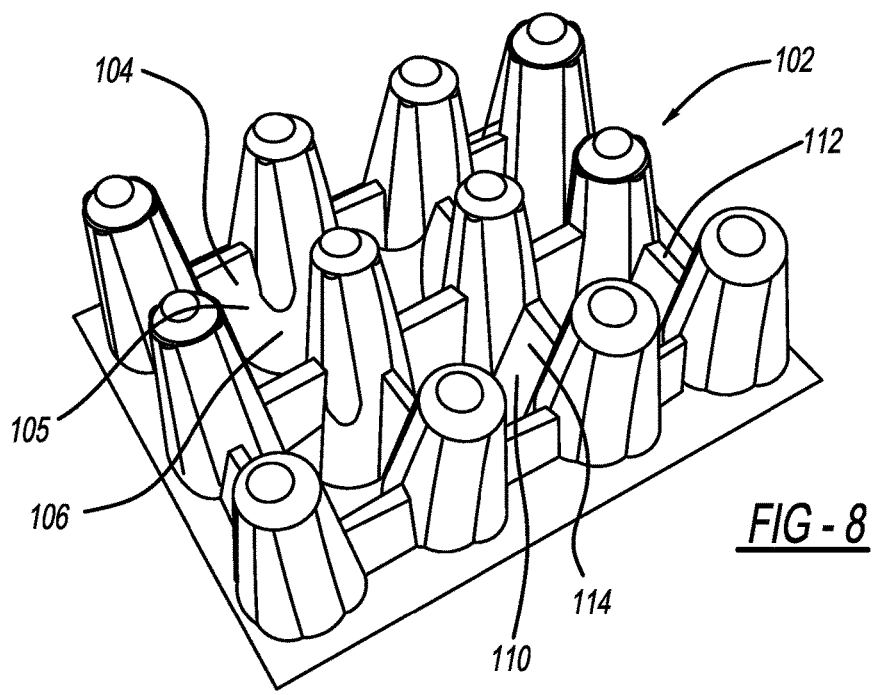
FIG. 8 is a perspective view of another horticulture tray according to the present teachings.

FIG. 8 is a perspective view of another horticulture tray 102 according to the present teachings. The horticulture tray 102 is shown including growing cells 104, a first aperture 105 defined at a first end 6. A sidewall 110 continuously tapers to a second end (not shown) opposite the first end 6. In an optional configuration, the sidewalls 110 of a plurality of growing cells 104 can merge to form a dam 114 which is lower than a top lip 112. The optional dam 114 retains liquid in an individual growing cell 104, while allowing liquid to flow between cells when the liquid is filled above the dam 114, but below the top lip 112.

Figure 9:
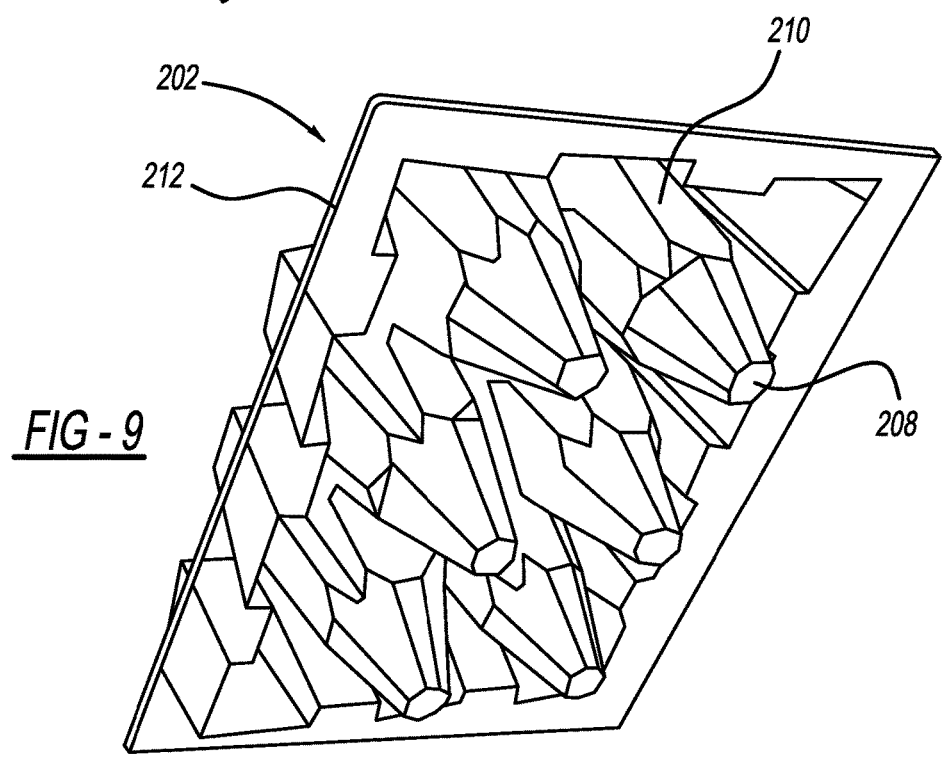
FIG. 9 is a perspective view of another horticulture tray according to the present teachings.

FIG. 9 is a perspective view of another horticulture tray 202 according to the present teachings. The horticulture tray 202 is shown from a second end 208 including a continuously tapered sidewall 210 and a top lip 212.

Figure 10:
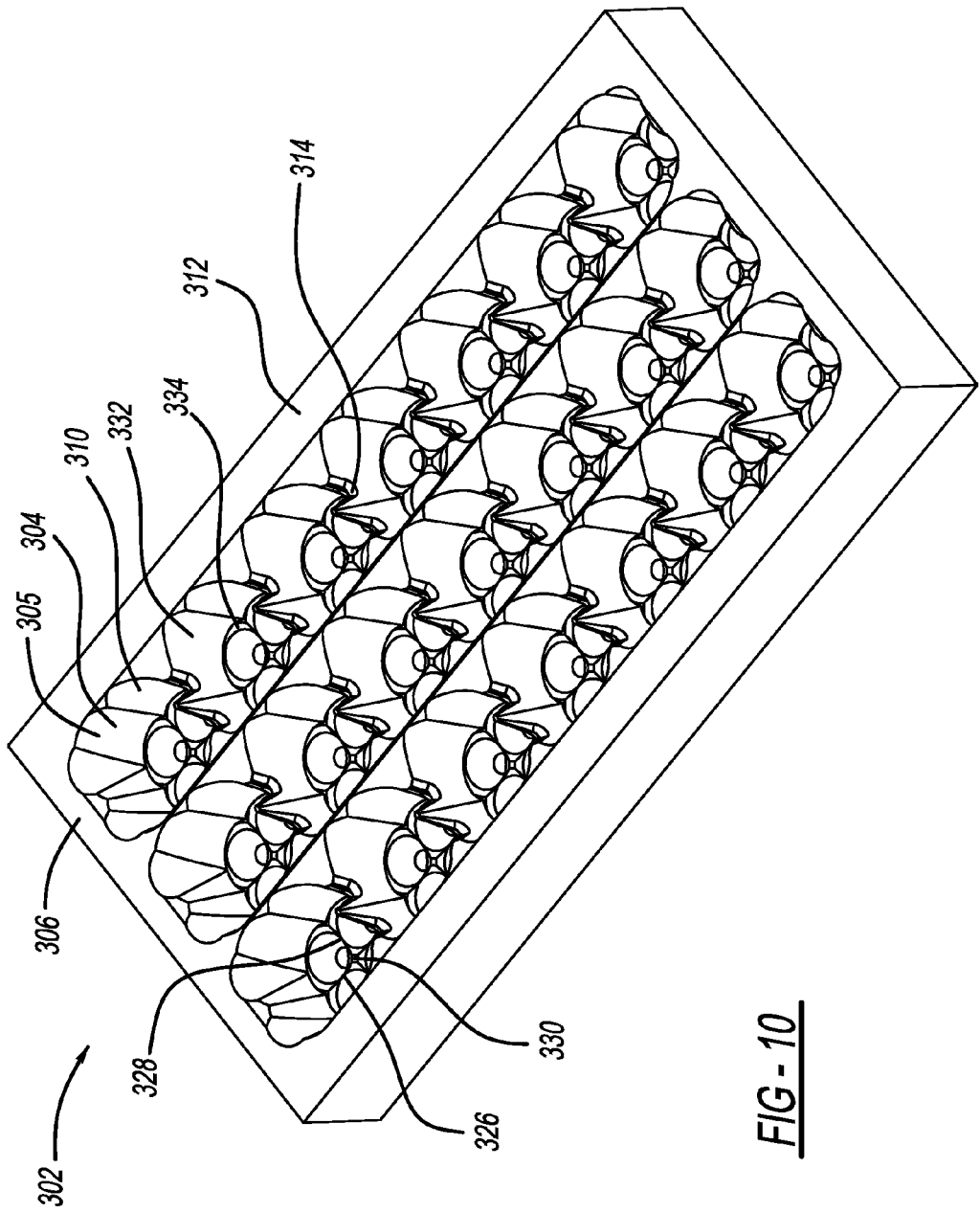
FIG. 10 is a perspective view of yet another horticulture tray according to the present teachings.

FIG. 10 is a perspective view of another horticulture tray 302 according to the present teachings. The horticulture tray 302 is shown from a first end 304 and shown as a matrix of growing cells 304. The growing cells 304 include a first aperture 305 defined at a first end 306, a sidewall 310, and a top lip 312. An optional dam 314 is also shown. A first length 332 and a second length 334 of the sidewall 310 are shown. Also shown are a lateral support ridge 326, a longitudinal support ridge 328, and a support peak 330.

Figure 11:
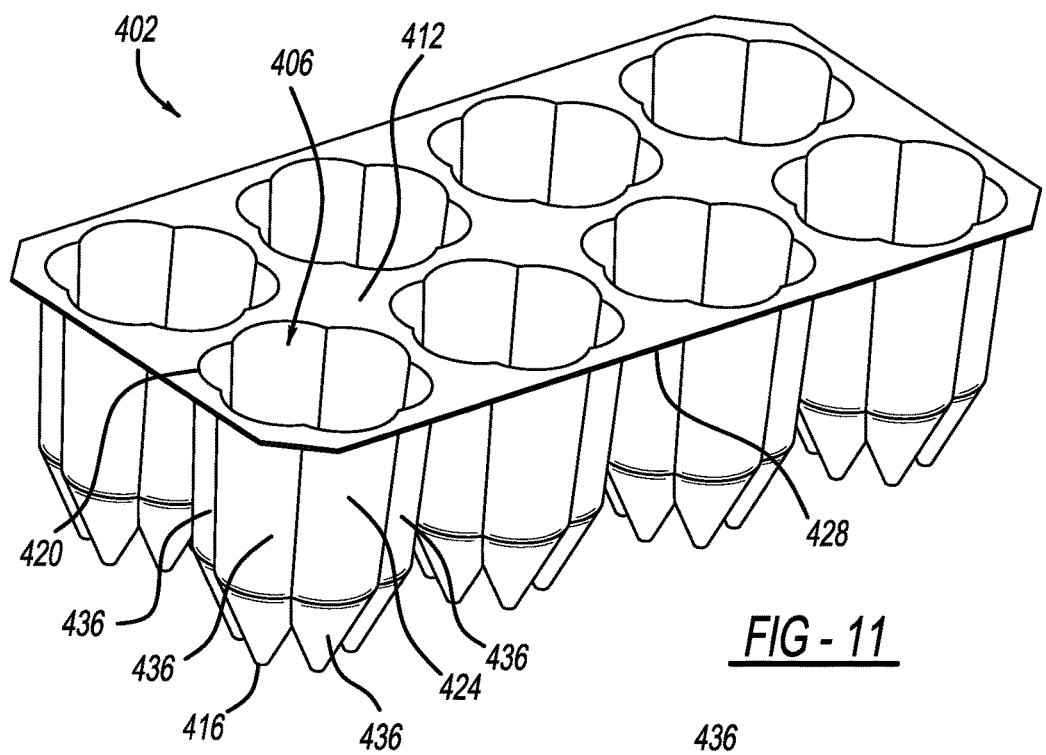
FIG. 11 is a perspective view of another horticulture tray according to the present teachings.
Figure 12:
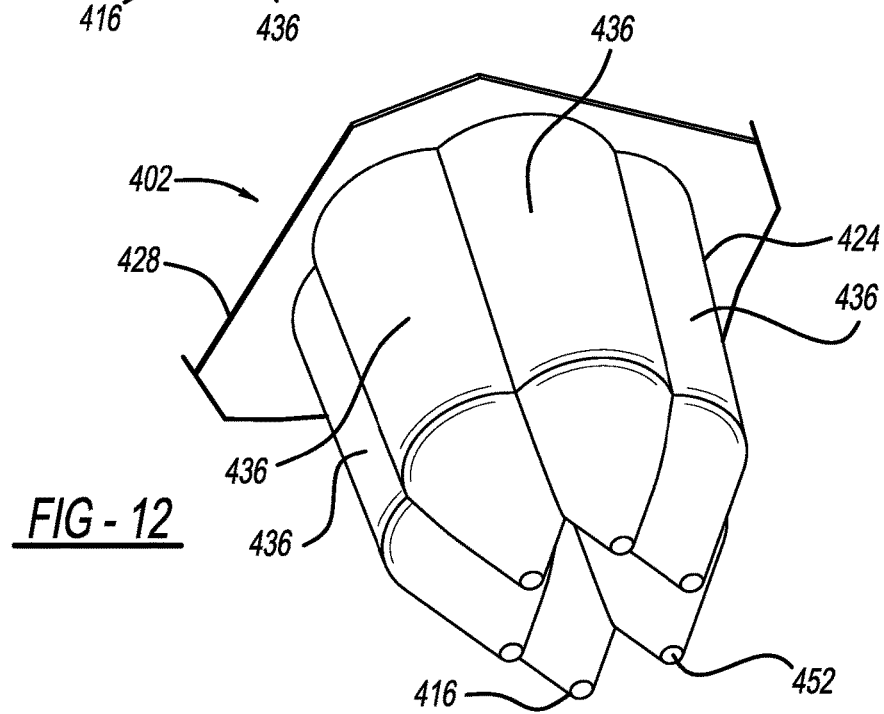
FIG. 12 is a perspective view of a portion of the horticulture tray of FIG. 11.

FIG. 11 is a perspective view of another horticulture tray 402 according to the present teachings. The horticulture tray 402 can be similar to the horticulture tray 2 (shown in FIGS. 1-7) except as shown or otherwise described herein. The horticulture tray 402 is configured for growing and transporting plants grown in stabilized growth plugs, such as growth plug 404 illustrated in FIG. 15, while preventing root spiraling or girdling, and promoting proper root architecture through air pruning, while also effectively retaining water. The horticulture tray 402 can generally be made of a substantially rigid material, such as plastic or any other suitable polymer that can be formed using methods known in the art, such as vacuum thermoforming or injection molding for example.

The horticulture tray 402 may include one or more growing cells 406. FIG. 11 shows a matrix of growing cells 406 (i.e. a plurality of rows and columns), though the tray 402 can include an array of growing cells 406 (i.e. a single row of growing cells 406), or as few as a single growing cell 406. When an array or matrix of growing cells 406 are included, the distances between the centers of each growing cell 406 can be equal to allow uniform plant growth such that each plant has equal space to develop foliage.

With additional reference to FIGS. 12-16, a single one of the growing cells 406 is illustrated. The growing cell 406 can have a central axis 408 (shown in FIGS. 15 and 16) and can generally narrow from a first end 412 to a second end 416, which is axially opposite the first end 412. The growing cell 406 can include a first aperture 420 defined at the first end 412, a sidewall 424 extending between the first and second ends 412, 416, a top lip 428 proximate to the first end 412, and a support peak 432 (shown in FIGS. 13-16) proximate to the second end 416. When an array or matrix of growing cells 406 are included, an optional configuration allows the sidewalls 424 of adjacent cells to merge below the top lip 428, to form a channel or dam similar to the dams 14 and 314 (best shown in FIGS. 1, 5 and 10). The optional dam can retain liquid in an individual growing cell 406, while allowing liquid to flow between cells 406 when the liquid is filled above the dam, but below the top lip 428. The optional dam allows for the separate watering of individual growing cells 406 when filled below the dam, while allowing for even distribution of water amongst a plurality of cells 406 when filled above the dam.

The top lip 428 can be flat with no over-turned edges such that when multiple horticulture trays 402 are arranged adjacent to each other, the top lips 428 may be overlapped. Overlapping of the top lips 428 can prevent water loss from run-off and spills that would otherwise fall between adjacent horticulture trays 402. The top lip 428 is further configured such that when the top lips 428 of adjacent horticulture trays 402 are overlapped, the distance between the centers of the growing cells 406 of the adjacent horticulture tray 402 is equal to the distance between the centers of the growing cells 406 within each individual horticulture tray 402. This configuration allows equal space to each plant for uniform plant growth when multiple horticulture trays 402 are arranged adjacently.

The second end 416 of the growing cell 406 is generally more narrow than the first end 412 and the sidewall 424 of the horticulture tray 402 can continuously taper from the first end 412 to the second end 416 such that no horizontal surfaces contact the roots of a stabilized growth plug 404 (shown in FIGS. 15 and 16) when the stabilized growth plug 404 is seated in the growing cell 406. The horticulture tray 402 also includes no surfaces extending perpendicularly from the sidewall 424 that contact the stabilized growth plug 404.

The sidewall 424 can define a plurality of arcuate chambers 436, which can be disposed in a radial array about the central axis 408 of the growing cell 406. As best shown in FIG. 13, the arcuate chambers 436 can have an arcuate shape with a radius or curve angle θ between 110° and 130° and measured about a center 440 of the arcuate chamber 436 that can be radially outward from the central axis 408 of the growing cell 406. The sidewall 424 can define 4-7 arcuate chambers 436. The arcuate chambers 436 can be open (i.e. concave) toward the center of the growing cell 406 (i.e. central axis 408), and can extend longitudinally between the first and second ends 412, 416. In the particular example provided, the sidewall 424 defines 6 arcuate shaped chambers 436, each having a radius or curve angle θ of 120°.

Each arcuate chamber 436 can have a diameter that varies between the first and second ends 412, 416 such that the arcuate chamber 436 has first diameter proximate to the first end 412, a second diameter between the first and second ends 412, 416, and a third diameter proximate to the second end 416. The diameter of each arcuate chamber 436 can reduce from the first end 412 to the second end 416, such that the arcuate chamber 436 tapers from the first end 412 to the second end 416. Thus, the first diameter can be greater than the second diameter, and the second diameter can be greater than the third diameter. As best shown in FIG. 15, the arcuate chamber 436 can have a first length 444 that tapers from the first diameter to the second diameter at a first rate. The arcuate chamber 436 can have a second length 448 that tapers from the second diameter to the third diameter at a second rate that can be greater than the first rate.

Each arcuate chamber 436 can include a drain hole 452 at the second end 416 of the growing cell 406. As best shown in FIGS. 15 and 16, the arcuate chambers 436 can cooperate to define a plant supporting portion 456 at the junction of first and second lengths 444, 448. The plant supporting portion 456 can be devoid of horizontal surfaces. In the example provided, the plant supporting portion 456 has a curve or radius that curves from the first length 444 to the second length 448. The plant supporting portion 456 can be configured to support the stabilized growth plug 404 within the growing cell 406, as illustrated in FIGS. 15 and 16. The plant supporting portion 456 can be spaced apart from the second end 416 by a first distance 460.

As best shown in FIGS. 15 and 16, the support peak 432 can be centered on the central axis 408 of the growing cell 406 and can extend from the second end 416 toward the first end 412 such that the support peak 432 is spaced apart from the second end 416 by a second distance 464. The support peak 432 can support the center of the stabilized growth plug 404 spaced apart from the second end 416. The second distance 464 can be greater than the first distance 460, such that the support peak 432 extends above the plant supporting portion 456. The support peak 432 can have a generally conical or tapered shape that expands with increased proximity to the second end 416. The support peak 432 can be positioned such that when the stabilized growth plug 404 is placed in the growing cell 406, and pressed downward (i.e. toward the second end 416), the support peak 432 can penetrate into the center of the stabilized growth plug 404 and force or displace a lower portion of the stabilized growth plug 404 radially outward from the support peak 432 (e.g. radially outward relative to the central axis 408) such that the lower portion of the stabilized growth plug 404 wedges into sealing contact with the plant supporting portion 456.

As best shown in FIG. 15, the sidewall 424 and the stabilized growth plug 404 can define a perimeter gap 468 radially between the sidewall 424 and the stabilized growth plug 404 and axially between the plant supporting portion 456 and the first end 412. The perimeter gap 468 can permit roots that reach the outer perimeter of the stabilized growth plug 404 to be air-pruned, supporting a proper root structure. The sealing contact between the stabilized growth plug 404 and the plant supporting portion 456 can permit retention of water in the perimeter gap 468, thus inhibiting water from draining from the growing cell 406 directly through the drain holes 452.

Figure 17:
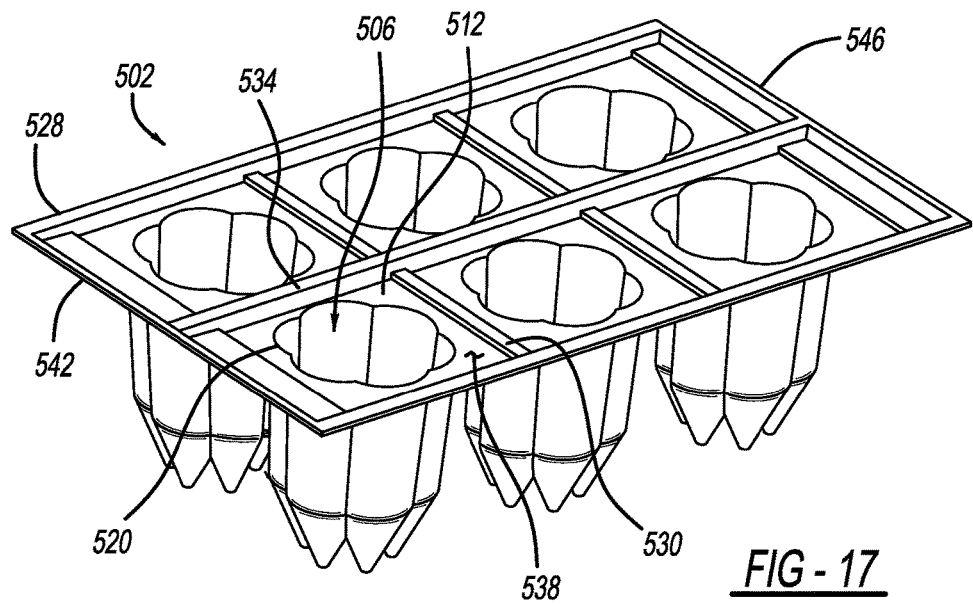
FIG. 17 is a perspective view of another horticulture tray according to the present teachings.

FIG. 17, is a perspective view of another horticulture tray 502 according to the present teachings. The horticulture tray 502 can be similar to the horticulture tray 402 (shown in FIGS. 11-16) except as shown or otherwise described herein. The horticulture tray 502 can include a plurality of growing cells 506. FIG. 17 shows a matrix of growing cells 506 (i.e. a plurality of rows and columns), though the tray 502 can include an array of growing cells 506 (i.e. a single row of growing cells 506). The distances between the centers of each growing cell 506 can be equal to allow uniform plant growth such that each plant has equal space to develop foliage.

The horticulture tray 502 can include a top lip 528 and a plurality of ridges 530. The horticulture tray 502 can also include a dividing wall 534. The top lip 528 can be similar to the top lip 428 (FIG. 11) and can be disposed about the outer perimeter of the tray 502. The dividing wall 534 can extend between adjacent rows of the growing cells 506. In the example provided, the dividing wall 534 can be flush with the outer lip 528, though other configurations can be used.

The growing cells 506 can each have a first end 512 similar to the first end 412 (FIG. 11) and can define a first aperture 520 similar to the first aperture 420 (FIG. 11). The first end 512 can have a first surface 538 that can be generally flat or planar and disposed about the first aperture 520. The first surface 538 can be spaced apart from and below the top lip 528. The ridges 530 can extend from the dividing wall 534 to the top lip 528 to separate adjacent ones of the growing cells 506 within a particular row. The ridges 530 can be spaced apart from and between the top lip 528 and the first surface 538.

With typical plant trays (not shown), water can splash off of a dense canopy or foliage of the plants during watering and splash into adjacent cells of the tray, causing uneven watering of the cells. The ridges 530, top lip 528, and dividing wall 534 of the tray 502 can retain water generally in the growing cell 506 that is intended to be watered. When plants in the tray 502 are watered, water can fill the perimeter gap (e.g. perimeter gap 468 shown in FIG. 15) of the growing cell 506. Excess water can overflow out the first aperture 520 and be retained in at the first end 512 above the first surface 538 and below the ridge 530. If the water level rises above the ridges 530 but below the top lip 528 and the dividing wall 534, the water can flow over the ridges 530 into adjacent growing cells 506 while remaining in the row.

The ridges 530 and dividing wall 534 can be particularly advantageous when the plant tray 502 is on a slope or when the canopy or foliage of the plants is not dense, by retaining adequate water within a growing cell 506. For example, when the tray 502 is on a slope such that one end (e.g. end 542) is positioned higher than an opposite end (e.g. end 546), the ridges 530 can retain water up to the level of the ridges 530 and permit water above the ridges to flow downhill to an adjacent one of the growing cells 506 in the row. Additionally, when the tray 502 is on a slope such that one row is higher than another row, and the tray 502 is watered (e.g. hand watered) from only one end (e.g. end 542 or end 546), then the dividing wall 534 can prevent water from flowing downhill into adjacent rows, while water can still overflow the ridges 530 into adjacent ones of the growing cells 506 in that particular row. The ridges 530, dividing wall 534, and top lip 528 can also add strength to the tray 502 to resist bending.

Figure 18:
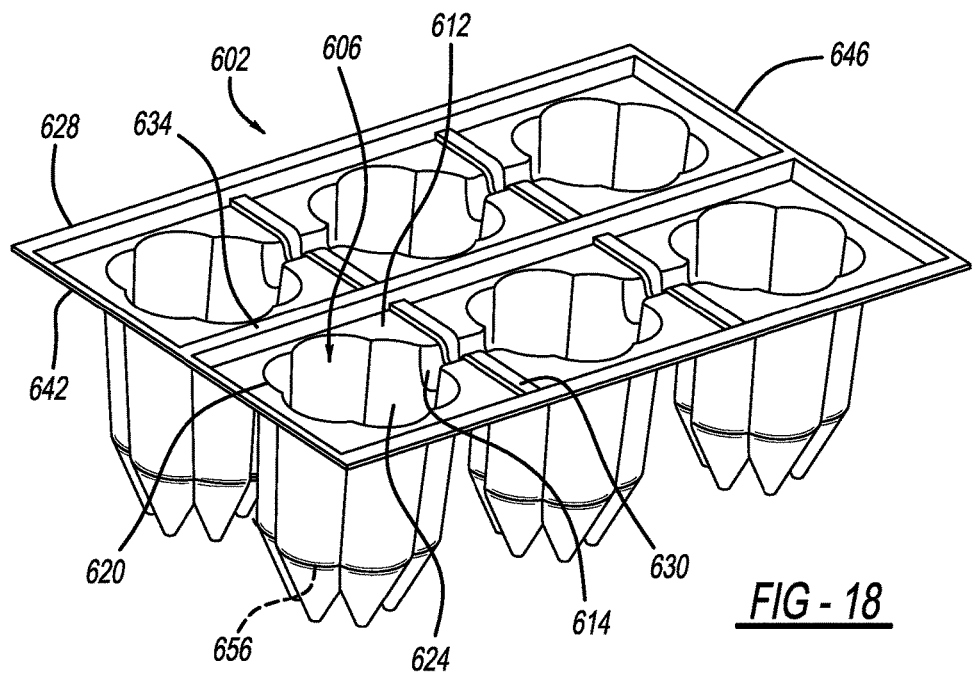
FIG. 18 is a perspective view of another horticulture tray according to the present teachings.

FIG. 18 is a perspective view of another horticulture tray 602 according to the present teachings. The tray 602 can be similar to the tray 502 (FIG. 17) except as shown or otherwise described herein. The tray 602 can include a plurality of growing cells 606 similar to growing cells 506 (FIG. 17), a top lip 628 (similar to top lip 528 shown in FIG. 17), ridges 630 (similar to ridges 530 shown in FIG. 17), and a dividing wall 634 (similar to dividing wall 534 shown in FIG. 17). The tray 602 can also include one or more dams or channels 614. The dams 614 can join adjacent growing cells 606 in a particular row for fluid communication between the adjacent growing cells 606. The dams 614 can extend through adjacent sidewalls 624 (similar to sidewalls 424 shown in FIG. 11) and the ridges 630. The dams 614 can terminate at a point between a first end 612 (similar to first end 512 shown in FIG. 17) and a plant supporting portion 656 (similar to plant supporting portion 456 shown in FIG. 15).

When plants in the tray 602 are watered, water can fill the perimeter gap (e.g. perimeter gap 468 shown in FIG. 15) of the growing cell 606. Excess water can overflow out the perimeter gap and through the dam 614 into adjacent growing cells 606. The ridges 630, dividing wall 634, and top lip 628 can retain water in the tray 602 while adding strength to the tray 602 to resist bending.

With typical plant trays (not shown), water can splash off of a dense canopy or foliage of the plants during watering and splash into adjacent cells of the tray, causing uneven watering of the cells. The ridges 630, top lip 628, and dividing wall 634 of the tray 602 can retain water generally in the growing cell 606 that is intended to be watered. The relative heights of the ridges 630, top lip 628, dividing wall 634, and the dam 614 can allow excess water to overflow into adjacent growing cells 606 to permit more even watering of adjacent plants. This can be particularly advantageous when the trays 602 are hand watered wherein uneven amounts of water can be directed to different growing cells 606, or a large amount of water can splash off the canopy of an intended plant and into adjacent growing cells 606. Additionally, when the tray 602 is on a slope such that one row is higher than another row, and the tray 602 is watered (e.g. hand watered) from only one end (e.g. end 642 or end 646), then the dividing wall 634 can prevent water from flowing downhill into adjacent rows, while water can still overflow the dam 614 and ridges 630 into adjacent ones of the growing cells 606 in that particular row.

The horticulture tray of the present teachings advantageously promotes proper root structure. For example, the horticulture tray promotes proper root structure by supporting a plant growing within a stabilized growth plug such that substantially the entire length of the growth plug is exposed to air, resulting in air pruning of the roots. The horticulture tray further promotes proper root structure by including walls that continuously taper from a larger diameter to a smaller diameter without including horizontal surfaces that would contact the stabilized growth plug and cause root spiraling. Additionally the horticulture tray promotes proper root growth by retaining adequate water for growth. The horticulture tray of one aspect of the present teachings can be a container for growing trees and plants with multiple holes in the bottom and no horizontal surfaces.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be used only to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A horticulture growing system comprising:
    a stabilized growth plug having a growing medium stabilized in a generally circular shape with a plant in the growing medium; and
    a horticulture tray defining a growing cell sized and shaped to receive the stabilized growth plug therein, the growing cell including:
        a first end defining a first aperture having a plurality of arcuate shaped edges;
        a second end opposite to the first end; and
        a sidewall defining a plurality of arcuate shaped chambers that extend longitudinally between the first and second ends, each arcuate shaped chamber defining a plant supporting portion proximate to and spaced apart from the second end, each arcuate shaped chamber continuously tapering from the first end to the plant supporting portion at a first rate and continuously tapering from the plant supporting portion to the second end at a second rate that is greater than the first rate, the second rate defines a plurality of cones;
        wherein the plant supporting portion is configured to support the stabilized growth plug spaced apart from the second end, and the sidewall is configured to define a perimeter gap between the stabilized growth plug and a portion of the sidewall that is between the first end and the plant supporting portion, the perimeter gap being configured to promote uniform growth of a root system by air pruning.
2. The horticulture growing system of claim 1, wherein the plant supporting portion is further configured to create a seal between the stabilized growth plug and the sidewall, the seal being configured to retain liquid in the perimeter gap.
3. The horticulture growing system of claim 1, wherein the growing cell is devoid of horizontal surfaces at the plant supporting portion.
4. The horticulture growing system of claim 1, wherein the growing cell is devoid of surfaces extending perpendicularly from the sidewall.
5. The horticulture growing system of claim 1, wherein the second end comprises a supporting peak, the supporting peak configured to support a stabilized growth plug spaced apart from the second end.
6. The horticulture growing system of claim 5, wherein the plant supporting portion is spaced apart from the second end by a first distance and the supporting peak is spaced apart from the second end a second distance that is greater than the first distance.
7. The horticulture growing system of claim 6, wherein the supporting peak is configured to protrude into a center of the stabilized growth plug and force the stabilized growth plug radially outward and into contact with the plant supporting portion.
8. The horticulture growing system of claim 1, wherein the second end comprises at least one drain hole, the drain hole being configured to allow excess liquid to drain from the second end.
9. The horticulture growing system of claim 1, wherein the horticulture tray comprises a plurality of the growing cells.
10. The horticulture growing system of claim 1, wherein the sidewall defines 4-7 arcuate shaped chambers, wherein each arcuate shaped chamber has a curve angle of 110°-130°.
11. A horticulture growing system comprising:
    a stabilized growth plug having a growing medium stabilized in a generally circular shape with a plant in the growing medium; and
    a horticulture tray defining a growing cell sized and shaped to receive the stabilized growth plug therein, the growing cell including:
        a first end defining a first aperture having a plurality of arcuate shaped edges;
        a second end, the second end is opposite to the first end;
        a sidewall defining a plurality of arcuate shaped chambers disposed about a central axis of the growing cell and extending longitudinally between the first and second ends and having a curve angle of 110°-130°, each arcuate shaped chamber defining a plant supporting portion axially between first and second ends, each arcuate shaped chamber having a first length that tapers between the first end and the plant supporting portion at a first rate and a second length that tapers from the plant supporting portion to the second end at a second rate that is greater than the first rate, the second rate defines a plurality of cones;
        the growing cell being devoid of horizontal surfaces at the plant supporting portion; and
        at least one drain hole configured to allow excess liquid to drain from the second end;
        wherein the plant supporting portion is configured to support the stabilized growth plug spaced apart from the second end, the plant supporting portion being configured to create a seal between the stabilized growth plug and the sidewall, wherein the sidewall is configured to define a perimeter gap between the stabilized growth plug and a portion of the sidewall that is axially between the first end and the plant supporting portion, the perimeter gap being configured to promote uniform growth of a root system by air pruning and to retain liquid axially between the seal the first end.

12. The horticulture growing system of claim 11, wherein the sidewall defines 4-7 of the arcuate shaped chambers.

13. The horticulture growing system of claim 11, wherein the plant supporting portion is axially spaced apart from the second end by a first distance and the second end comprises a supporting peak that is axially spaced apart from the second end a second distance that is greater than the first distance, wherein the supporting peak is configured to protrude into a center of a stabilized growth plug and force a portion of the stabilized growth plug radially outward and into sealing contact with the plant supporting portion.

\* \* \* \* \*